Oct. 23, 1962   E. J. SWIMMER ETAL   3,059,346
TOY PUNCHED-CARD ILLUMINATED READER
Filed June 20, 1961   3 Sheets-Sheet 2

INVENTORS
Ernest Swimmer
and Richard L. Koontz
BY
S. Lee Helms
attorney

Oct. 23, 1962   E. J. SWIMMER ETAL   3,059,346
TOY PUNCHED-CARD ILLUMINATED READER
Filed June 20, 1961   3 Sheets-Sheet 3

INVENTORS
Ernest J. Swimmer
BY and Richard J. Koontz
H. Lee Helms
attorney

United States Patent Office 3,059,346
Patented Oct. 23, 1962

3,059,346
TOY PUNCHED-CARD ILLUMINATED READER
Ernest J. Swimmer, 229 E. 53rd St., New York, N.Y., and Richard I. Koontz, Thomas Road, East Syracuse, N.Y.
Filed June 20, 1961, Ser. No. 118,413
6 Claims. (Cl. 35—9)

The characteristic of the invention is the employment of a perforated disk, with illumination behind it, the perforations at spaced radial areas being formed as indicia, such as letters and numerals, and controlling means for bringing the disk to a position of rest in front of the illumination in accordance with punched out markings on cards which control means for holding the disk in positions of rest, each in accordance with the edge cut-out of a given card. Thus each card may have printed thereon a question, such as "Electrons are positively charged particles," and the card will also have printed thereon one of the indicia on the disk indicating a negative answer, and a second indicia indicating an affirmative answer. The user of the device will select the indicia which he believes to represent the correct answer. When the card is moved into operative control position, in a carrier for the card, the disk will be illuminated and rotated to the point where the correct indicia is brought to a position of rest and showing the indicia correctly answering the question. This is but a simple example of operation, and the cards may be very widely varied as to subject and markings.

The invention will be described with reference to the accompanying drawings, in which.

Figure 1:
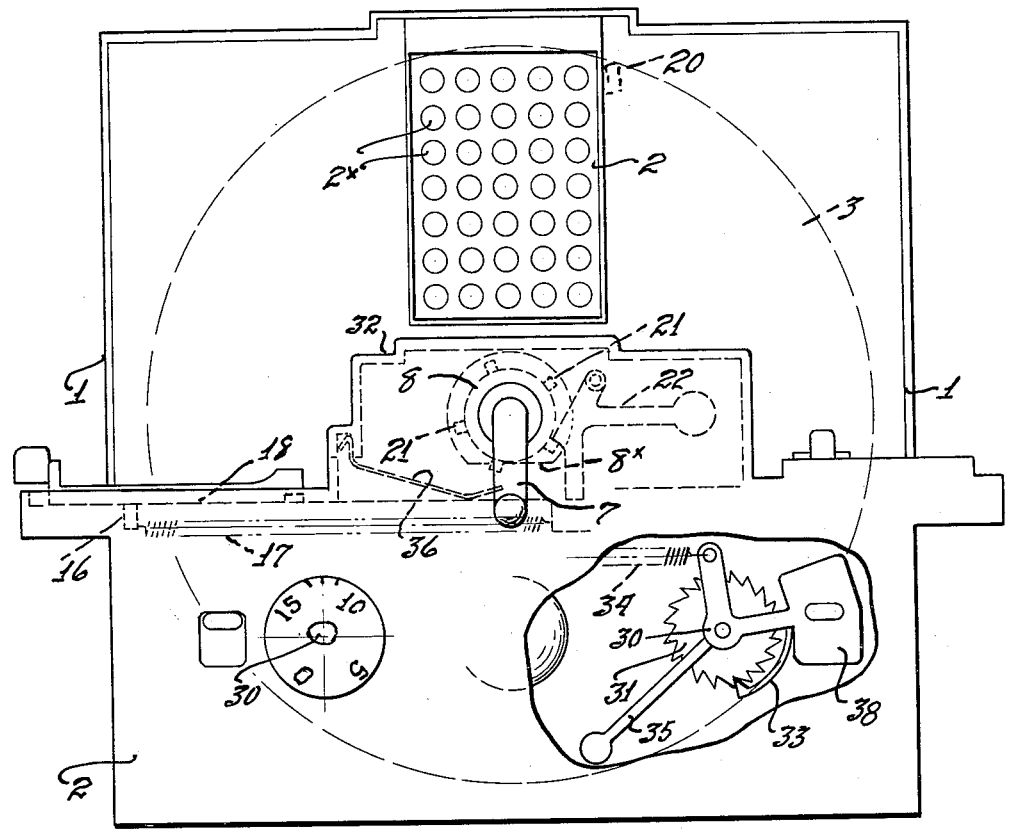
FIG. 1 is a schematic view in front elevation, showing some of the primary elements in full and dotted lines, the front of the device being partly broken away.

Referring to the drawings, the device comprises a box-like casing 1, having a window 2 at its front, the latter carrying rows of openings at 2x, which preferably are closed by transparent lens-like members. Back of window 2 is a disk 3, best shown in FIG. 9, and which in the present embodiment is apertured to form, in each of radial lines, spaced indicia. These indicia are shown as the letters F, E, T, A, and C. Intermediate the perforations forming said letters may be punched openings as indicated at 4, FIG. 4, so that as the disk rotates there will appear flashes of light through the lens apertures of the window, intermediate the registration of the letter-indicia with the window.

Figure 2:
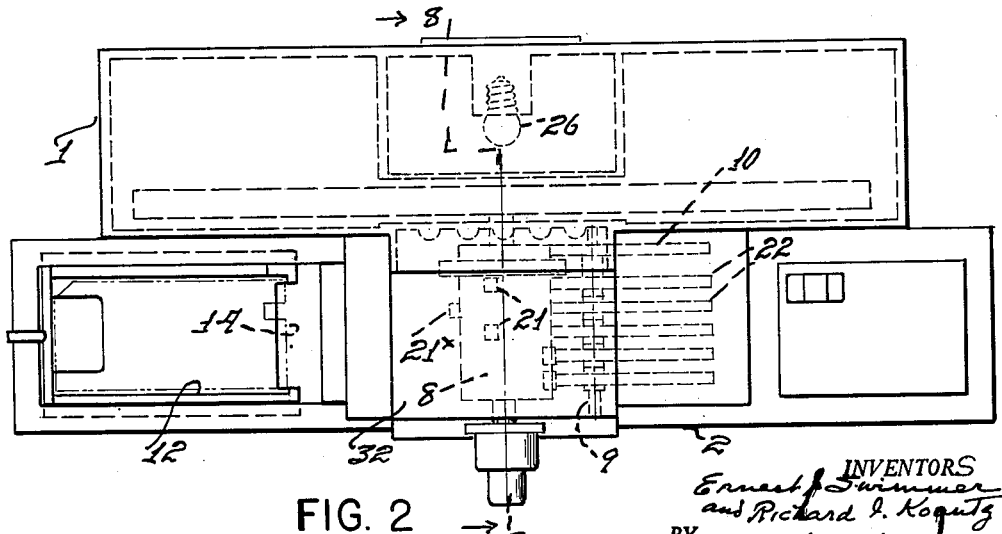
FIG. 2 is a top plan view, partly in dotted lines.
Figure 9:
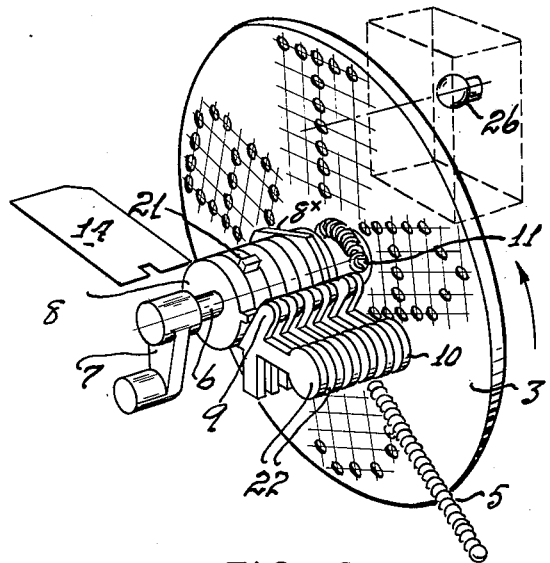
FIG. 9 is a perspective view of the perforated disk, the illuminating lamp, the spring for rotating the disk, primary elements of the control for the disk, and a punched card in position for movement toward the control elements.

The device includes means for rotating the disk through the tension of a spring 5, FIG. 9, and FIG. 4, which spring is placed under tension until the perforated disk is latched in operative positive, such means being as follows:

Projected through the front of the casing 1 is a shaft 6 carrying an operating handle 7. On the shaft is a drum 8, to be rotated by handle 7. Fixed to an extension of the drum is the hub 3x of perforated disk 3. As indicated in FIG. 2, the front of the casing carries a shaft 9 on which is a pawl 10 for latching the drum when the handle has been given a movement to rotate the drum to initial position. The pawl may be slightly weighted at its end, so as normally to lie in position to engage a stud or shoulder on the drum for holding the latter against counter-clockwise movement. Thus the latching pawl 10 may be in the form shown in FIG. 5 and capable of being pushed out of operating position to enable the drum and the perforated disk to be spring-moved in a counter clockwise position.

In the drawings, handle 7 is shown in down direction, and hence either at the end of a complete rotation of the drum and perforated disk under the impulse of spring 5, or at the instant of its complete rotation to tension the spring and effect latching of the drum. Handle 7 is turned clockwise to tension the spring, one end of the spring being partly wound around the drum and connected at 11 thereto, FIG. 9, and the opposite end of the spring is secured to casing 1.

Figure 5:
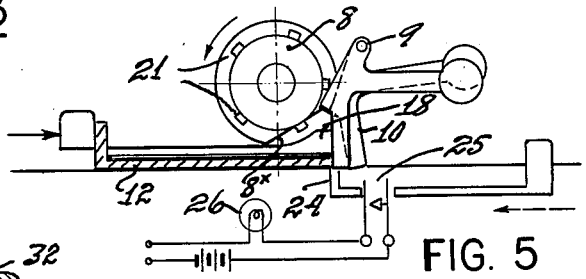
FIG. 5 is a fragmentary view in elevation, showing the wiring diagram and switch means for illumination.
Figure 6:
FIG. 6 is a plan view of one of the front-edge punched cards.
Figure 7:
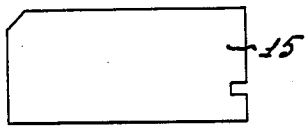
FIG. 7 is a view similar to FIG. 6, showing the edge punch-out in a different position on a card.
Figure 8:
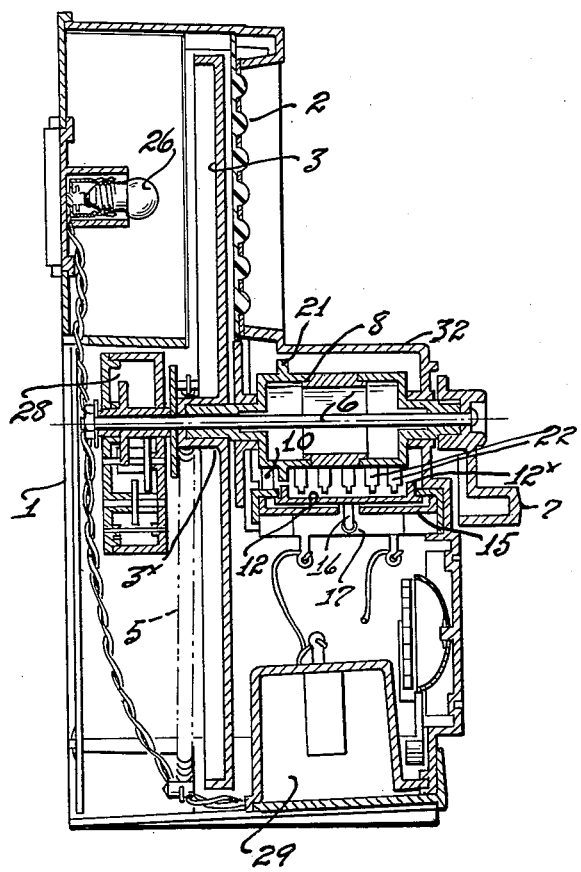
FIG. 8 is a view in elevation, being a transverse section, generally on the line 8—8, FIG. 2.

For the release of latching pawl 10, a tray 12 for a card such as 14 and 15, FIGS. 6 and 7, is adapted to be manually moved on a table 15, FIG. 8, the table having a longitudinal slot, and the tray having a depending finger 16 which engages a compression spring 17. When tray 12 is pushed inwardly, a front marginal finger-like end thereof, shown at 18, FIG. 5, moves pawl 10 out of latching position, and the drum with perforated disk 3 is rotated by spring 5 back to initial position, and until a stop projection on the perforated disk, indicated at 20, FIG. 1 strikes a fixed part of the casing assembly.

Figure 4:
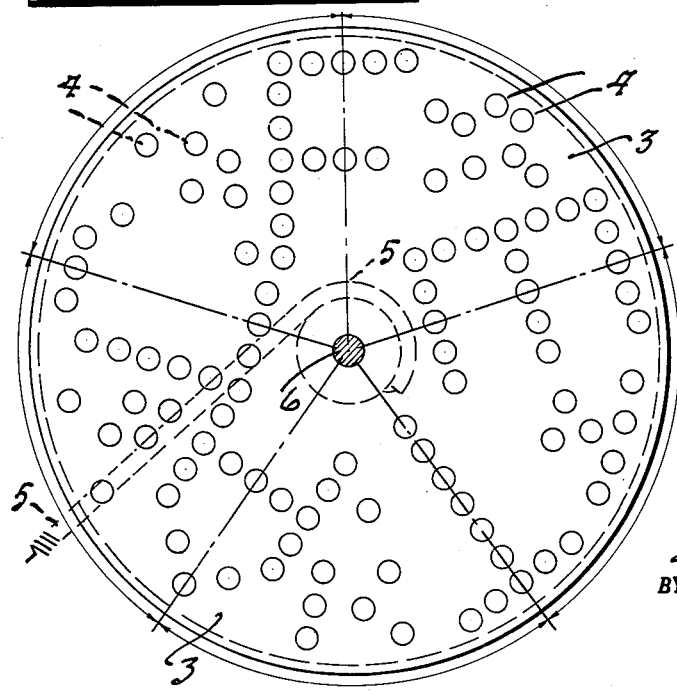
FIG. 4 is a view in elevation of a perforated disk, the centers of the indicia being shown by radial line, and a spring for rotating the disk being shown in dotted lines.

As noted with reference to FIG. 4, the perforated disk 3 provides five indicia in the form of letters punched in the disk. On drum 8 are five detent projections 21. A latching pawl is provided for each of these projections 21. The group of pawls being indicated at 22, each pawl is positioned in registration with one of the detent projections, and each detent projection meets its respective pawl for latching thereby when its appropriate perforated disk indicia comes into register with window 2 and the lens covered aperture therein.

Each card is adapted to free the latching pawls 22 from the detent projections, except for a specific detent projection predetermined by the cut-out punch in the card for a specific indicia, and the operation is as follows:

When card 14 is placed in the tray, its front margin will project a slight distance, as shown in FIG. 2, and its punched cut-out will be in register with drum detent projection 21x, FIG. 2. When the tray is manually moved towards the drum, it will clear the latter because of the drum flattened peripheral area 8x, FIG. 1, and the projecting end of the card will push back all the pawls into inoperative position, except pawl 22x, FIG. 2, which controls detent projection 21x. At the same time, the tray finger 18 will release latching pawl 10, and a finger 24, FIG. 5, on the tray will close the lamp circuit switch 25, FIG. 5, illuminating the lamp 26. Spring 5 will rotate the drum and perforated disk until detent projection 21x, FIG. 2, meets the latching pawl of group 22, shown in register therewith in FIG. 2, whereupon the drum will be brought to a rest, and the indicia controlled by the card 14 will be shown through the window 2. For each of the four remaining indicia, a card having a front punched end properly positioned in accordance with a particular stop projection 21 on the drum 8 will effect the same result.

For slowing down the rotation of the drum and perforated disk, any suitable gear-operated escapement, schematically indicated in FIG. 8, at 28, may be employed.

A dry cell battery box 29 is provided at the base of casing 1, with the usual contacts and leads to the circuit, as shown in FIG. 8.

As shown in FIG. 1, visual disk counters may be carried by casing 1 at the front thereof, each disk on a shaft 30, the shaft carrying a ratchet wheel 31, FIG. 1, the member 38 being a finger-piece carrying a pawl 33, the movement of the finger-piece and pawl being against a light spring 34, or a weight 35, or both.

As the card is moved by the tray toward registration with the pawls 22, a light spring carried by member 32 of the casing, the spring being indicated at 36, FIG. 1, may be used to hold the cards firmly on the tray.

Figure 3:
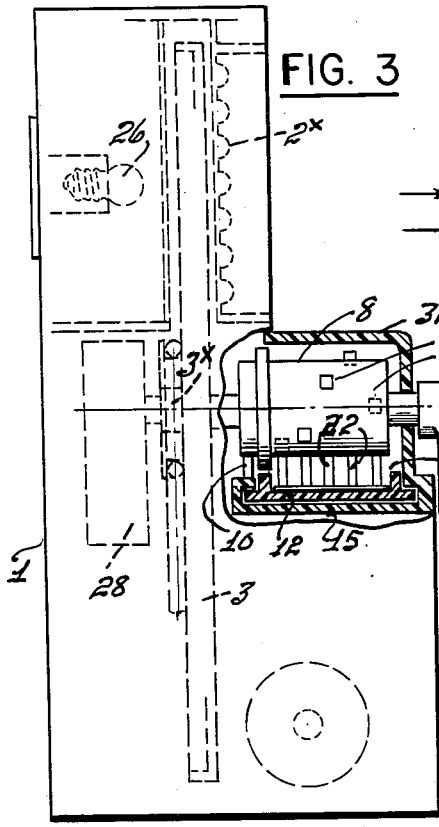
FIG. 3 is an end view of the structure, partly broken away.

It will be seen from the above that each card is punched with a front end opening in accordance with the indicia which correctly shows, by its illumination, the correct answer to the question on the card. The card controlling the drum positioning projection and pawl therefore will push all of the remaining indicia control pawls out of active position. When a card control drum projection has been latched by its pawl, and the proper indicia thus brought into registration with the window and illuminated, handle 7 may be turned clockwise, which will free the pawl latch projection on the drum, as will be seen by reference to FIG. 9, each pawl having a releasing cam surface, and the tray 12 likewise will be released so that the tray will be pushed back forwardly into initial position by spring 17, FIGS. 1 and 8. The tray may be frictionally held in forwardly projected position by friction engagement of one of its side walls with the annular ring projection on the drum as shown in FIG. 3. In that figure, the said side wall and ring projection are shown slightly separated for clarity of illustration, but in practice they will frictionally contact, as shown in FIG. 5. Clockwise rotation of the drum will restore the initial position of the tray, aided by spring 17.

If the means for illumination is omitted, the disk may bear spaced indicia such as letters or numerals to be exposed through the window, and these indicia may be printed or silk-screened on the disk, or the disk may carry them in any other suitable manner.

It is to be understood that various modifications may be made in the form and arrangement of the elements constituting the embodiment illustrated in the drawings, without departing from the spirit of the invention.

Having described our invention, what we claim and desire to secure by Letters Patent is as follows:

1. A toy punched-card reader comprising a disk provided with a plurality of spaced indicia, means for rotating the disk including a rotary drum, a projection on the drum for each indicia position thereof, a latching pawl appropriate to each projection, a plurality of cards, each having a front end punched out area, a manually movable carrier for a selected card and adapted to move a card into releasing contact and action with all of the pawls except that pawl which is in register with a cut-out area of a card, whereby the last named pawl will stop the rotating drum when its appropriate projection meets said pawl.

2. A toy punched-card reader constructed in accordance with claim 1, in which the spaced indicia in the disk are formed by cut-outs in the disk, in combination with an electric circuit adapted for connection with a source of electric power, an illuminating means in said circuit, a make and break switch in said circuit, and means including said manually movable carrier for closing said switch.

3. A toy-punched card reader constructed in accordance with claim 1, in combination with a latching pawl for said manually movable carrier and adapted to latch the carrier when the latter is moved into registration with the drum, means on the drum for receiving said latching pawl, and a handle on the drum for moving the latter in position adapted to release its latching pawl, the latching pawls being positioned in a box formation, and a casing having a slideway for the carrier and a box formation on said casing.

4. A toy punched-card reader constructed in accordance with claim 1, in combination with means for rotating the disk and consisting of a flexible coil spring having one end secured to a pulley-like member carried by the disk, the opposite end of the spring being fixed in position, and stop means adapted to stop the rotation of the disk at a predetermined point of its rotation independently of the disk latching pawls.

5. A toy-punched card reader constructed in accordance with claim 1, in combination with a casing, a window in the casing, rows of lens-like elements in the window, the spaced indicia provided for the disk being formed by perforations therein, a slideway in front of the window for said manualy movable carrier, a box formation under the window, a common shaft for the latching pawls, a handle for manual rotation of the drum, to simultaneously rotate the disk, a tension spring applied to the disk, said rotation of the handle imparting tension thereto for rotating the disk, a latching pawl for the manually movable carrier, and means on said carrier for releasing the last-named latching pawl.

6. A toy-punched card reader constructed in accordance with claim 1, in combination with a compression spring having one fixed end and its opposite end engaging the manually movable carrier, whereby movement of the carrier into active position to the point where it is held by its latch compresses the spring and release of the latch for spring retraction of the carrier.

References Cited in the file of this patent

UNITED STATES PATENTS 2,688,443     Leonard _____ Sept. 7, 1954

FOREIGN PATENTS 112,205     Great Britain _____ Jan. 3, 1918